US011241788B2

(12) United States Patent
Pollack et al.

(10) Patent No.: US 11,241,788 B2
(45) Date of Patent: Feb. 8, 2022

(54) METHODS AND APPARATUS FOR DYNAMIC POSITION ADJUSTMENTS OF A ROBOT GRIPPER BASED ON SAMPLE RACK IMAGING DATA

(71) Applicant: Siemens Healthcare Diagnostics Inc., Tarrytown, NY (US)

(72) Inventors: Benjamin S. Pollack, Jersey City, NJ (US); Steven Pollack, Washington Crossing, PA (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 326 days.

(21) Appl. No.: 16/316,953

(22) PCT Filed: Jun. 27, 2017

(86) PCT No.: PCT/US2017/039586
§ 371 (c)(1),
(2) Date: Jan. 10, 2019

(87) PCT Pub. No.: WO2018/013345
PCT Pub. Date: Jan. 18, 2018

(65) Prior Publication Data
US 2019/0160666 A1    May 30, 2019

Related U.S. Application Data

(60) Provisional application No. 62/362,532, filed on Jul. 14, 2016.

(51) Int. Cl.
*B25J 9/16*    (2006.01)
*B25J 9/02*    (2006.01)
(Continued)

(52) U.S. Cl.
CPC .............. *B25J 9/1612* (2013.01); *B25J 9/026* (2013.01); *B25J 9/1664* (2013.01); *B25J 9/1669* (2013.01);
(Continued)

(58) Field of Classification Search
CPC ...... B25J 9/1612; B25J 9/1697; B25J 19/023; B25J 15/08; B25J 9/026; B25J 9/1664;
(Continued)

(56) References Cited

U.S. PATENT DOCUMENTS

| 5,314,662 A * | 5/1994 | Hemzy | ..................... B01L 7/00 414/176 |
| 5,518,686 A * | 5/1996 | Masterson | ......... G01N 35/1002 141/130 |

(Continued)

FOREIGN PATENT DOCUMENTS

| CN | 103502791 A | 1/2014 |
| CN | 103988064 A | 8/2014 |

(Continued)

OTHER PUBLICATIONS

PCT International Search Report and Written Opinion dated Sep. 29, 2017 (9 Pages).

(Continued)

*Primary Examiner* — Jaime Figueroa

(57) ABSTRACT

Methods of positioning a gripper to pick or place a specimen container from a sample rack. One method includes providing a robot including the gripper, the gripper moveable in a coordinate system by the robot and including gripper fingers, providing a sample rack including receptacles containing specimen containers, providing data, obtained by imaging, regarding the specimen containers in the sample rack, and dynamically orienting the gripper based upon the data. The data may include population and/or configuration data (Continued)

and the dynamic orientation may include gripper finger opening distance, gripper finger rotational position, and/or gripper offset distance. Gripper positioning apparatus for carrying out the method are disclosed, as are other aspects.

20 Claims, 6 Drawing Sheets

(51) Int. Cl.
  *G01N 35/00*    (2006.01)
  *G06T 7/70*    (2017.01)
  *B25J 19/02*    (2006.01)
  *B25J 15/08*    (2006.01)
  *B65B 5/10*    (2006.01)
  *G01N 35/04*    (2006.01)

(52) U.S. Cl.
  CPC .............. *B25J 9/1697* (2013.01); *B25J 15/08* (2013.01); *B25J 19/023* (2013.01); *B65B 5/105* (2013.01); *G01N 35/0099* (2013.01); *G01N 35/00732* (2013.01); *G06T 7/70* (2017.01); *G01N 2035/0491* (2013.01)

(58) Field of Classification Search
  CPC .............. B25J 9/1669; G01N 35/0099; G01N 35/00732; G01N 2035/0491; G06T 7/70; B65B 5/105; G05B 2219/39082
  USPC .................................................. 700/245–264
  See application file for complete search history.

(56) References Cited

U.S. PATENT DOCUMENTS

| | | | |
|---|---|---|---|
| 5,623,415 A * | 4/1997 | O'Bryan | G01N 35/021 198/617 |
| 6,293,750 B1 | 9/2001 | Cohen et al. | |
| 9,400,285 B2 * | 7/2016 | Ochranek | G01N 35/025 |
| 9,656,395 B2 * | 5/2017 | Youngwerth | B23Q 7/043 |
| 2003/0223916 A1 * | 12/2003 | Testrut | B01L 9/06 422/400 |
| 2004/0267405 A1 | 12/2004 | Ingenhoven et al. | |
| 2010/0291615 A1 * | 11/2010 | Ronsick | G01N 35/0099 435/29 |
| 2013/0123089 A1 | 5/2013 | Johns et al. | |
| 2014/0112558 A1 | 4/2014 | Bean et al. | |
| 2015/0003678 A1 | 1/2015 | Watanabe et al. | |
| 2015/0142171 A1 | 5/2015 | Li et al. | |
| 2015/0299639 A1 * | 10/2015 | Kleefstra | C12M 41/14 435/287.3 |
| 2015/0355208 A1 | 12/2015 | German et al. | |
| 2016/0025757 A1 | 1/2016 | Pollack et al. | |
| 2016/0124006 A1 | 5/2016 | Pedain | |
| 2020/0108397 A1 * | 4/2020 | Andrade | B01L 9/06 |

FOREIGN PATENT DOCUMENTS

| | | |
|---|---|---|
| CN | 105203780 A | 12/2015 |
| JP | 05142232 A | 6/1993 |
| JP | 2004-082239 A | 3/2004 |
| WO | 2000/038046 A1 | 6/2000 |
| WO | 2013/023130 A1 | 2/2013 |
| WO | 2013/070756 A2 | 5/2013 |
| WO | 2015/191702 A1 | 12/2015 |
| WO | 2016/133919 A1 | 8/2016 |
| WO | 2016/133924 A1 | 8/2016 |
| WO | 2016/133926 A1 | 8/2016 |

OTHER PUBLICATIONS

Extended EP Search Report dated Jul. 4, 2019 of corresponding European Application No. 17828169.7, 5 Pages.

* cited by examiner

METHODS AND APPARATUS FOR DYNAMIC POSITION ADJUSTMENTS OF A ROBOT GRIPPER BASED ON SAMPLE RACK IMAGING DATA

CROSS-REFERENCE TO RELATED APPLICATIONS

This application claims priority to U.S. provisional application Ser. No. 62/362,532 filed on Jul. 14, 2016, the contents of which is incorporated herein by reference in its entirety.

FIELD

The present disclosure relates to methods and apparatus adapted to pick and/or place a specimen container from and/or to a sample rack in systems for processing biological liquids.

BACKGROUND

In medical testing and processing, the use of robotics may minimize exposure to, or contact with, biological liquid samples (otherwise referred to herein as "specimens") and/or may significantly increase productivity. For example, in some automated testing and processing systems (e.g., clinical analyzers), specimen containers (such as test tubes, vials, and the like) may be transported to and from sample racks (sometimes referred to as "cassettes") and to and from a testing or processing location of a testing or processing apparatus.

Such transportation may be accomplished by the use of an automated mechanism such as a robot having a coupled gripper. The gripper may have opposed gripper fingers that are configured to grasp respective specimen containers. The specimens may be of varying size (e.g., height and/or diameter). The gripper may be moved in two or more coordinate directions by the robot. In this way, specimen containers (containing a specimen to be tested or processed) may be gripped by the gripper, and then moved from one location to another.

For example, in a pick operation, the robot gripper may be moved to above a theoretical center location of a receptacle of the sample rack, and with grippers fully open, lowered to a specified height and then closed to grip the specimen container. This is followed by raising the gripper to pull the specimen container from the receptacle. In a place operation, the gripper, with specimen container in its grasp, may be moved over the center of a sample rack receptacle, lowered towards the receptacle to a controlled depth, and then the gripper fingers are fully opened to release the specimen container. This is followed by raising the gripper. Thus, using these pick and place operations, specimen containers may be moved to and from numerous receptacles of a sample rack. However, to maximize machine footprint usage, the receptacles in the sample racks are very tightly spaced.

Accordingly, methods and apparatus that may improve accuracy of positioning of a gripper relative to a sample rack in testing and processing systems are sought.

SUMMARY

In a first embodiment, a method of operating a gripper to pick or place a specimen container is provided. The method includes providing a robot including the gripper, the gripper moveable in a coordinate system by the robot and including gripper fingers, providing a sample rack including receptacles accessible by the gripper fingers, at least some of the receptacles containing specimen containers, providing data, obtained by imaging, regarding the specimen containers in the sample rack, and dynamically orienting the gripper fingers based upon the data.

In another embodiment, a gripper positioning apparatus is provided. The gripper positioning apparatus includes a robot including a gripper, the gripper moveable in a coordinate system by the robot and including gripper fingers, a sample rack including receptacles accessible by the gripper fingers, at least some of the receptacles containing specimen containers, and a controller including data, obtained by imaging, regarding the specimen containers in the sample rack, and operatively configured to cause the gripper fingers to be dynamically oriented based upon the data.

In a system aspect, a gripper positioning apparatus is provided. The gripper positioning apparatus includes a robot including a gripper, the gripper moveable in a coordinate system by the robot and including gripper fingers that open a variable distance, a sample rack including receptacles accessible by the gripper fingers, at least some of the receptacles containing specimen containers, and a robot controller configured to receive data, obtained by imaging, regarding the specimen containers in the sample rack, and operatively configured to cause the gripper fingers to be dynamically oriented to: open to an opening distance as determined based on the data, rotate to a rotational orientation as determined based on the data, or move to a x-y position to provide a condition of least interference between the gripper fingers and neighboring specimen containers contained in the sample rack as determined based on the data.

Still other aspects, features, and advantages of the present disclosure may be readily apparent from the following detailed description by illustrating a number of example embodiments, including the best mode contemplated for carrying out the present disclosure. The present disclosure may also be capable of different embodiments, and its several details may be modified in various respects, all without departing from the scope of the present disclosure. Accordingly, the disclosure is to cover all modifications, equivalents, and alternatives falling within the scope of the disclosure as defined in the appended claims.

DETAILED DESCRIPTION

In robots, such as those used to accomplish robotic pick and place operations in clinical analyzers or other testing or processing systems (e.g., automated loading and unloading systems, centrifuges, cold storage areas), jams, collisions, and/or jarring of specimen containers can occur under certain conditions.

Figure 1:
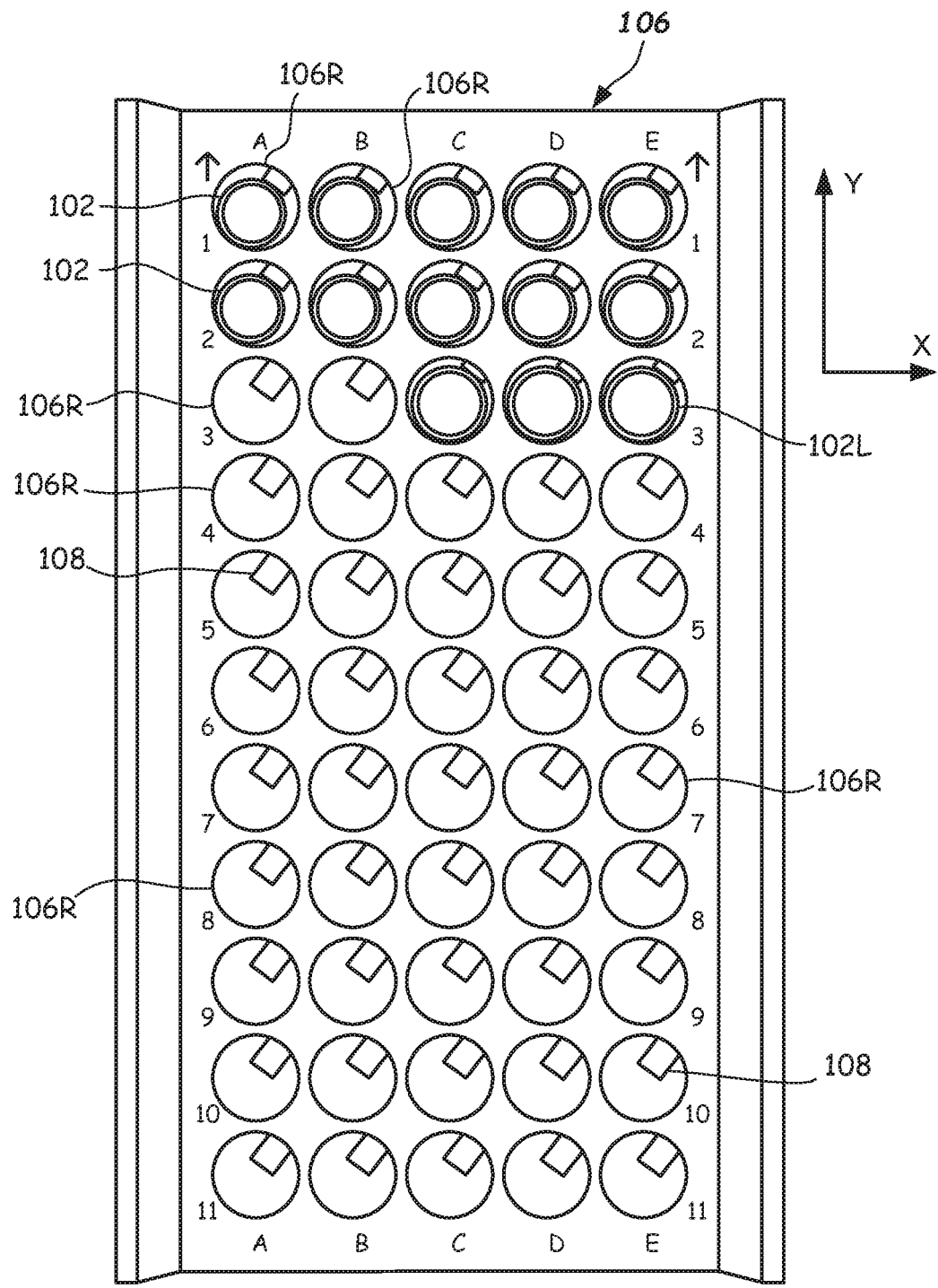
FIG. 1 illustrates a schematic top view of a sample rack including specimen containers according to the prior art.

In particular, as is shown in FIG. 1, specimen containers 102 (e.g., blood collection tubes) used in automated in vitro diagnostics (IVD) equipment may be provided in an open-topped (de-capped) condition and filled with a bio-hazardous liquid (e.g., blood, blood serum or plasma, urine, interstitial fluid, cerebral fluid, or other bodily fluids). The specimen containers 102 are stored in an approximately vertical orientation in receptacles 106R (a few labeled) within the sample rack 106 (the first two and a half rows populated with specimen containers 102).

To maximize the use of the equipment footprint, the receptacles 106R of the sample rack 106 may be very closely/tightly spaced. To accommodate specimen containers 102 of various diameters, sometimes springs 108 (a few labeled), such as one or more leaf-type springs, can be placed in each receptacle 106R in an attempt to either center the specimen container 102 or to force the specimen container 102 against a defined side wall of the receptacle 106R (as shown), all while largely maintaining the specimen container's vertical orientation.

However, due to mechanical tolerances and placement variations of the specimen containers 102, each specimen container 102 may lean away from a true vertical orientation in the receptacles 106R to some extent in one or more directions (e.g., X and/or Y as shown), thus causing a reduction in a theoretically perfect tube-to-tube clearance. Furthermore, because varying-diameter specimen containers 102 may be often processed on a given piece of equipment at the same time (e.g., Row 3 shown containing some relatively larger diameter specimen containers 102L), the clearance between adjacent specimen containers 102, 102L in the sample rack 106 may vary from receptacle 106R to receptacle 106R based upon tube size, tube leaning, and/or improper positioning in the receptacle 106R. Similarly, some receptacles 106R may be empty for some or all of the loading and unloading process.

The close-spacing of the receptacles 106R, combined with a goal of high throughput of the IVD equipment, may result in occasional unwanted contact (e.g., jams, collisions, and/or jarring) between gripper fingers 212A, 212B and a specimen container 102, or between a specimen container 102 being placed and another specimen container 102 as discussed above. Such contact may slow down automated processing, as damage caused by the contact may have to be corrected by manual operator intervention. For example, such contact can, in the some extreme cases, result in tube breakage, spills, and/or loss of specimen, all resulting in possibly downtime for remediation/cleanup.

An unrelated additional problem is that when a target specimen container 102 is placed in the receptacle 106R, in contact with the spring 108, and the gripper fingers are opened, the specimen container 102 may be jostled and the force exerted by the spring 108 may push the specimen container 102 sideways into contact with a wall of the receptacle 106R, possibly causing splashing of the specimen therein.

In the prior art, opening of the gripper fingers has been set to a constant value for all specimen containers 102 and receptacles 106R, with the constant value being selected taking into account the gripper finger width, all the expected tube sizes, possible placement variations, and receptacle 106R spacing. For pick and place operations, the gripper may be positioned above the center of the receptacle 106R and lowered to pick or place the specimen container 102 with the gripper opened to its maximum setting. Jams may be detected in the prior art by a crush sensor that detects vertical jams based upon exceeding a monitored threshold value, such as motor current. Similarly, a crash sensor may be provided to sense horizontal contact above a threshold value.

In view of the foregoing, one or more embodiments of the disclosure provides methods and apparatus to set a controlled extent of opening (gripper finger opening distance) of the gripper fingers based on sample rack 106 imaging data. The imaging data may include population data and/or configuration data. Population data is data about the presence or absence of neighboring specimen containers 102 around a particular target receptacle 106R. "Target receptacle" as used herein refers to a receptacle 106R that has been selected to undergo an operation thereat, such as a target specimen container 102 pick or place operation. "Target specimen container" as used herein is a specimen container 102 that has been selected to undergo a pick or place. Configuration data is data concerning the orientation and/or size of specimen containers 102 surrounding the target receptacle 106R, as well as the orientation and/or size of the target specimen container 102.

According to one or more embodiments, the extent of gripper finger opening may be dynamically varied for each pick or place operation. The variation may be dynamically selected responsive the population and/or configuration data for the particular target specimen container. In another embodiment, the X and/or Y positioning of the gripper and thus gripper fingers may be dynamically varied and offset from nominal centered position for each pick or place operation based upon population data and/or configuration data. In this way gripper positioning may be offset to account for offset of the specimen container in a receptacle. In yet another embodiment, the rotational positioning/orientation of the gripper fingers may be dynamically varied for each pick or place operation based upon population data and/or configuration data. The phrase "dynamically varied" as used herein means that for each particular specimen container pick or place operation, one or more of the parameters of the gripper (gripper finger opening distance, gripper offset, and/or gripper finger rotational orientation) are adjusted to facilitate suitable clearances between the gripper fingers and the surrounding specimen containers or the specimen container being picked.

Methods and apparatus in accordance within one or more embodiments may dynamically determine a controlled opening distance, X and Y gripper position, and/or rotational orientation of the gripper fingers. The dynamic determination takes into account the population data of specimen containers 102 in the sample rack 106 and/or configuration of specimen containers in the sample rack 106.

For example, methods and apparatus may take into account population data such as whether surrounding receptacles 106R contain specimen containers 102 or not. Similarly, one or more embodiments, may take into account configuration data regarding size (e.g., diameter and/or height) of one or more of the surrounding specimen containers 102, offset in X and Y of one or more of the surrounding specimen containers 102, or, in the case of a target specimen container 102 to be picked, its size (e.g., diameter and height) and/or whether the target specimen container 102 is leaning, i.e., offset in X and/or Y.

This ability to dynamically adjust an extent of the gripper finger opening and/or the nominal gripper position in X and Y, and/or gripper finger rotational orientation, may dramatically reduce the propensity for contact (e.g., jams, collisions, and/or jarring) and thus reduce damage and/or spillage. This may reduce IVD instrument downtime.

These and other aspects and features of embodiments of the disclosure will be described with reference to FIGS. 2A-6 herein.

Figure 2A:
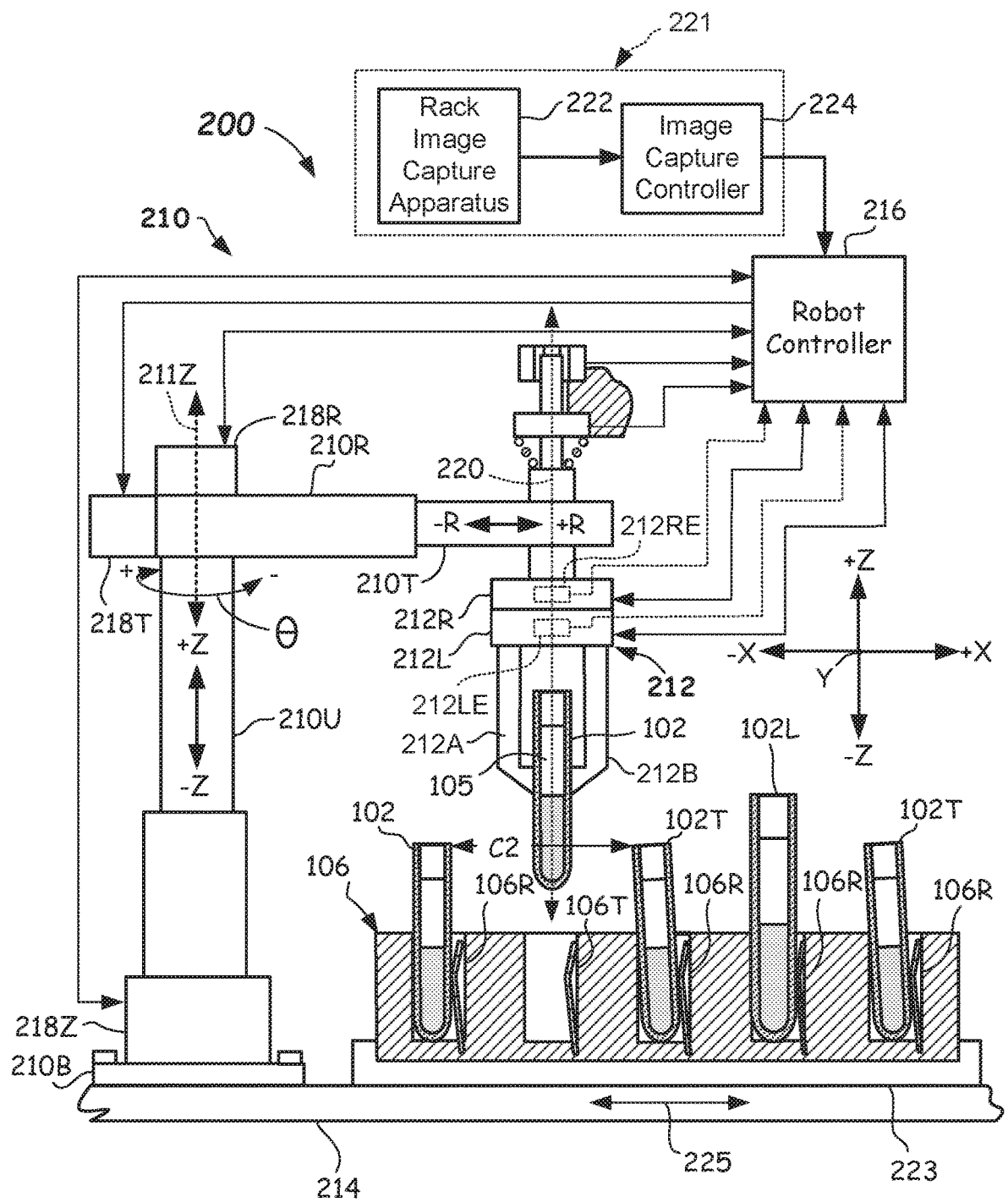
FIG. 2A illustrates a schematic side view of a gripper positioning apparatus configured for performing dynamic gripper finger positioning according to one or more embodiments.
Figure 2B:
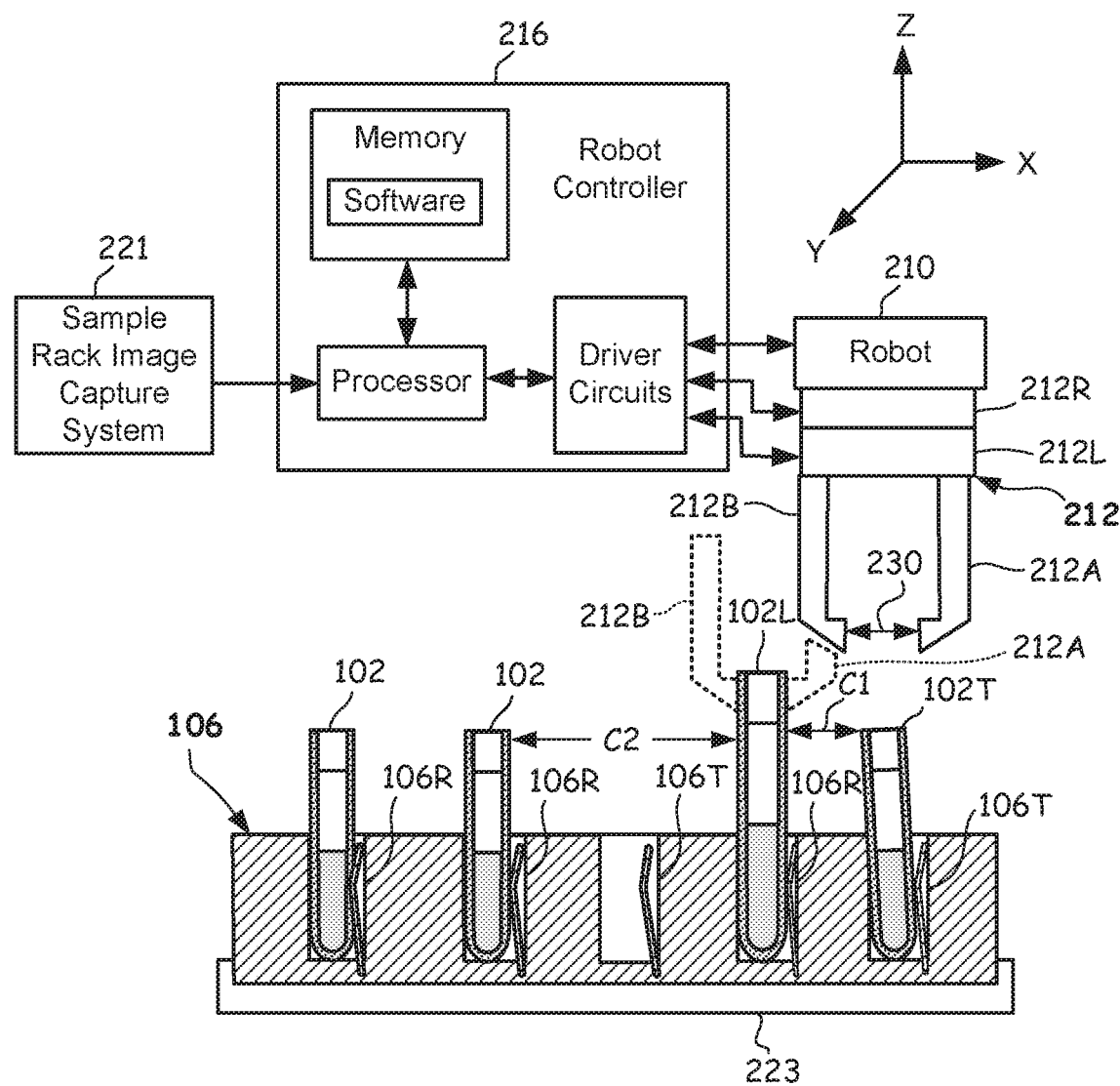
FIG. 2B illustrates a schematic side view of a gripper positioning apparatus configured for performing dynamic gripper finger positioning and illustrating components of the system according to one or more embodiments.

In accordance with one or more first apparatus embodiments, as best shown in FIGS. 2A and 2B, a gripper positioning apparatus 200 is described. The gripper positioning apparatus 200 includes a robot 210 that is useful for grasping and transferring a target specimen container 102T, such as blood collection vessel, vial, or the like, from a first location to a second location. The gripper positioning apparatus 200 may be used in any suitable transfer apparatus or system, or testing instrument or device, such as a laboratory automation system (LAS), an automated clinical analyzer, assaying instrument, or other processing device such as a centrifuge, where specimen containers 102 are moved to or from a sample rack 106. In one or more embodiments, the testing instrument or device may be used for determining a constituent component (e.g., an analyte concentration) in a biological fluid specimen 105 contained in the specimen container 102.

The robot 210 includes a gripper 212 coupled to a moveable part of the robot 210. For example, the robot 210 may be an R, theta, Z robot and may include a base 210B that may be coupled to a frame 214 of the testing instrument or other device, an upright portion 210U configured to move vertically (in the +Z and −Z directions), a telescoping portion 210T configured to move radially (in the +R and −R directions), and a rotary portion 210R configured to move rotationally about a vertical axis 2112 (in the +θ and −θ directions). "Gripper" as used herein means any member coupled to a robot component (e.g., coupled to a robot arm or the like) that is used in robotic operations to grasp and move an article (e.g., a specimen container 102) from one location to another, such as in a pick and place operation.

The gripper 212 may include two gripper fingers 212A, 212B that are relatively moveable to one another, and may be opposed to one another. Gripper fingers 212A, 212B are adapted to grasp articles, such as specimen containers 102 (e.g., blood collection tubes). The gripper fingers 212A, 212B may be driven to open and close to a defined opening distance by an actuation mechanism 212L coupled to each of the gripper fingers 212A, 212B. In particular, the gripper fingers 212A, 212B may open and close along any suitable direction in an X-Y plane (e.g., in the X or Y direction or combinations thereof), as in some embodiments a rotary actuator 212R may be provided that is configured to rotate the gripper fingers 212A, 212B to any rotational position/orientation. Thus, a line of action of opening and closing of the gripper fingers 212A, 212B can be rotated to coincide with areas on the sample rack 106 that have more space envelope or clearance based upon population and/or configuration data obtained by imaging. The Y direction is into and out of the paper, as shown.

The opening and closing of the gripper fingers 212A, 212B may be accomplished by the actuation mechanism 212L, which may be an electric, pneumatic, or hydraulic servo motor, or the like that is coupled to the gripper fingers 212A, 212B. Other suitable mechanisms for causing gripping action of the fingers 212A, 212B may be used. Likewise, in some embodiments, where rotational capability is provided, a rotary actuator 212R may be configured to rotate the gripper fingers 212A, 212B about gripper axis 220. The rotary actuator 212R may be an electric, pneumatic, or hydraulic servo motor, or the like.

The actuation mechanism 212L and rotary actuator 212R may be driven responsive to drive signals from a robot controller 216. One or more linear encoders 212LE and/or rotational encoders 212RE may be included to provide position feedback concerning the extent of opening of the gripper fingers 212A, 212B and/or the rotational orientation of the gripper fingers 212A, 212B relative to a calibrated reference or zeroed position. Furthermore, although two gripper fingers 212A, 212B are shown, embodiments of the present disclosure are equally applicable to a gripper 212 having more than two gripper fingers. Other gripper types may be used, as well. The robot 210 may be any suitable robot components capable of moving the gripper 212 in space (e.g., three-dimensional space) in order to move specimen containers 102.

In one or more embodiments, the robot 210 may, for example, have a rotational motor 218R adapted to rotate the rotary portion 210R to a controlled angular orientation in a rotational direction (e.g., +/−θ). The robot 210 may also include a vertical motor 218Z coupled to the upright portion 210U that may be adapted to move the gripper 212 in a vertical direction (e.g., along the vertical axis 2112 in the +/−Z direction, shown dotted). In one or more embodiments, the robot 210 may include a translational motor 218T adapted to impart translational motion of the gripper 212 coupled to the rotary portion 210R (e.g., along the +/−R direction). However, although an R, theta, Z robot is shown, other suitable robot types, robot motors and mechanisms for imparting X, Y, R, θ, and/or Z motion or other combinations may be provided. Suitable position feedback mechanisms may be provided for each degree of motion (X, Y, R, θ, and/or Z) such as from position and/or rotation encoders. Gantry robots may be used wherein a gantry cross beam is moveable in X, and the gripper 212 is moveable in Y and Z (and possibly about Z) relative to the gantry cross beam.

In one or more embodiments, the robot 210 may be used to accomplish three-dimensional coordinate motion (X, Y, and Z) of the gripper 212 so that specimen containers 102 may be placed in, or removed from, a receptacle 106R of the sample rack 106 or placed in or removed from other positions in testing or processing equipment. In particular, the X and Y position of the gripper 212 may be adjusted to provide a condition of least interference between the gripper fingers 212A, 212B and neighboring specimen containers 102 contained in the sample rack 106.

The robot controller 216 may include a suitable microprocessor, memory, power supply, conditioning electronics, circuitry and drivers adapted to carry out the robot motions and to control position of the gripper 212 in the X,Y,Z coordinate system, as well as the extent of gripper finger 212A, 212B opening and/or rotational orientation. Moreover, the robot controller 216 may include suitable communication capability to receive or access data from a sample rack image capture system 221. Functionally, the robot controller 216 may be configured to receive data, obtained by imaging, from the sample rack image capture system 221 regarding the specimen containers 102 contained in the sample rack 106. Further, as will be apparent from the following, the robot controller 216 may be operatively configured to cause the gripper fingers 212A, 212B to be dynamically oriented. The dynamic orientation may be to: open to an opening distance 230 (FIG. 2B) as determined based on the data; rotate to a rotational orientation as determined based on the data; or move to an x-y position to provide a condition of least interference between the gripper fingers 212A, 212B and neighboring specimen containers 102 contained in the sample rack 106 as determined based on the data.

Again referring to FIGS. 2A and 2B, the sample rack image capture system 221 may be provided in the gripper positioning apparatus 200. The sample rack image capture system 221 may include a rack image capture apparatus 222, and an image capture controller 224. In particular, the rack image capture apparatus 222 may be a suitable digital camera and may be placed at any suitable location where multiple images of the sample rack 106 can be obtained illustrating the sample rack 106 from multiple perspectives. For example, the rack image capture apparatus 222 may be placed above a moveable sample rack loading drawer 223. The sample rack 106 may be supported by the moveable sample rack loading drawer 223 and moved (as indicated by directional arrows 225) into the testing or processing equipment relative to the frame 214 to a position accessible by the robot 210. During that movement, the rack image capture apparatus 222 may take multiple digital images of a top of the sample rack 106 from various perspectives. For example, three or more images may be obtained at three or more different perspectives.

From these multiple digital images, image processing software stored in the image capture controller 224 may receive and process the image data and produce data based on the imaging. The data may comprise population data and/or configuration data on the amount, size, and orientation of the specimen containers 102 resident in the sample rack 106. The population data and/or configuration data may be accessed by the robot controller 216 via electronic communication and the data based on imaging may be used to determine and set one or more of the following: 1) opening distances of gripper finger 212A, 212B, 2) rotational orientation of gripper fingers 212A, 212B, and/or 3) placement of the gripper 212 in X, Y and/or Z when carrying out specimen container pick or place operations.

Optionally, the robot controller 216 and image capture controller 224 may be combined in one common controller and configured to process the images captured by the rack image capture apparatus 222 and control the operation of the robot 210, including control of the X and Y position of the gripper 212, the opening distance of the gripper fingers 212A, 212B, and/or the rotational orientation of the gripper fingers 212A, 212B.

Further details of the sample rack imaging system 221 and image capture controller 224 may be found in U.S. Pat. Pub. No. US2016/0025757 filed Mar. 14, 2014, to Pollack et al. entitled "Tube Tray Vision System"; US Pat. Pub. No. US2015/0355208 to German et al. entitled "Automation Tube Positioning Methodology"; PCT Application Pub. No. WO2015/191702 filed Jun. 10, 2015, and entitled "Drawer Vision System"; PCT Application No. PCT/US2016/018100 filed Feb. 16, 2016, and entitled "Locality-Based Detection Of Tray Slot Types And Tube Types In A Vision System"; PCT Application No. PCT/US2016/018112 filed Feb. 16, 2016, and entitled "Locality-Based Detection Of Tray Slot Types And Tube Types In A Vision System"; and PCT Application No. PCT/US2016/018109 filed Feb. 16, 2016, and entitled "Image-Based Tube Slot Circle Detection For A Vision System."

In more detail, the image capture controller 224 may receive the images from multiple perspectives and process them. The image processing may be carried out by taking each image and identifying geometrical features therein, such as tops of specimen containers and receptacle locations and conditions and then determine the offset of the specimen container top and size by way of counting pixels. From the processing, details on the population of the sample rack 106 may also be obtained. For example, each receptacle 106R may be assigned a distinct slot code, such as A1, A2, A3, etc., based upon its column and row location (see FIG. 1) on the sample rack 106. The image processing software may, based upon the image, determine population data on which receptacles 106R are empty, and which receptacles 106R contain a specimen container 102. This population data may be stored in a database in memory of the image capture controller 224 and may be accessed by the robot controller 216 or otherwise be communicated thereto.

Likewise, the processing software in the image capture controller 224 may process the images and therefrom extract various configuration data. Configuration data may include, for example, height, maximum outer diameter of the top of the specimen container 102, and an X and Y center location of the top of the specimen container 102 relative to the receptacle 106R that it is inserted into, wherein such configuration data can be correlated in a database to the distinct slot code, and may be used later in positioning the gripper 212 for minimum interference.

Figure 4:
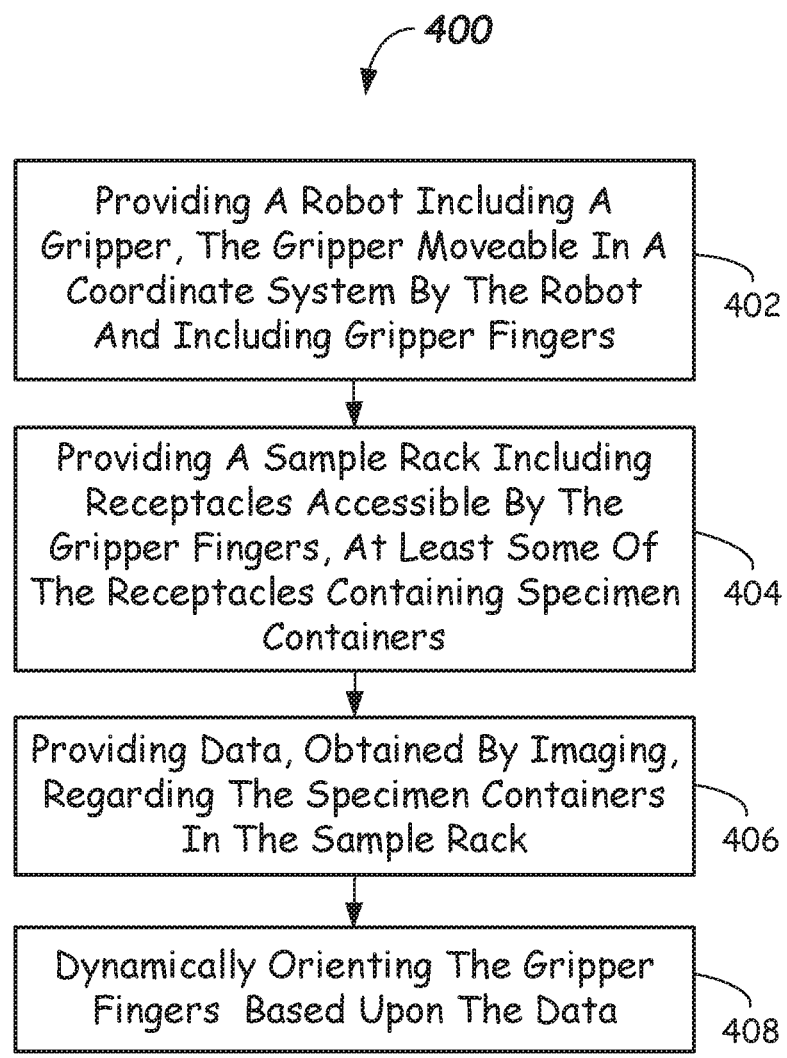
FIG. 4 is a flowchart illustrating a method of positioning gripper fingers to a specimen container according to embodiments.

In accordance with another embodiment of the disclosure, and as shown in FIG. 4, a method 400 of operating a gripper (e.g., gripper 212) to pick or place a specimen container (e.g., specimen container 102, 102T, 102L) is provided. The method includes, in 402, providing a robot (e.g., robot 210) including the gripper (e.g., gripper 212), the gripper moveable in a coordinate system (e.g., the X, Y, Z coordinate system) by the robot and including gripper fingers (e.g., gripper fingers 212A, 212B) that can selectively open and close an may be set to an opening distance 230 (FIG. 2B) that is variable. The opening distance 230 may range from a minimum distance to a maximum distance of opening measured between the specimen container inner contact surfaces of the gripper fingers 212A, 212B adapted to contact and grip the specimen containers 102. The opening distance 230 may include one or more intermediate opening distance values in some embodiments. Opening distances 230 may range from between about 8 mm to about 20 mm, for example. Other opening distances may be used. The opening distance between the gripper fingers 212A, 212B may be controlled by signals to the actuation mechanism 212L from the robot controller 216. For example, in one embodiment, the opening distance may be set to a small, a medium (intermediate), or a large opening distance 230 that are preselected, or set to a custom opening distance 230 based on the conditions and available space along a particular line of action 325.

The method 400 includes, in 404, providing a sample rack (e.g., sample rack 106) including receptacles (e.g., receptacles 106R) accessible by the gripper fingers (e.g., gripper fingers 212A, 212B), wherein at least some of the receptacles contain specimen containers (e.g., specimen containers 102, 102T, 102L). Accessible means that the gripper 212 can be moved a sufficient distance by the robot 210 to reach the receptacles 106R to pick the target specimen container 102T from or place the target specimen container 102T therein.

The method 400 further includes, in 406 providing data, obtained by imaging, regarding the specimen containers that are contained in the sample rack (e.g., sample rack 106). In particular, in one or more embodiments, the data may include population data regarding which of the receptacles 106R in the sample rack 106 contain specimen containers 102, and more specifically, which of the receptacles 106R surrounding the target receptacle 106T contain specimen containers 102. The data based on imaging may also contain data on which of the receptacles 106R are empty, and in particular, the population data comprises data on which of the receptacles 106R, surrounding a target receptacle 106T, are empty.

Figure 3A:
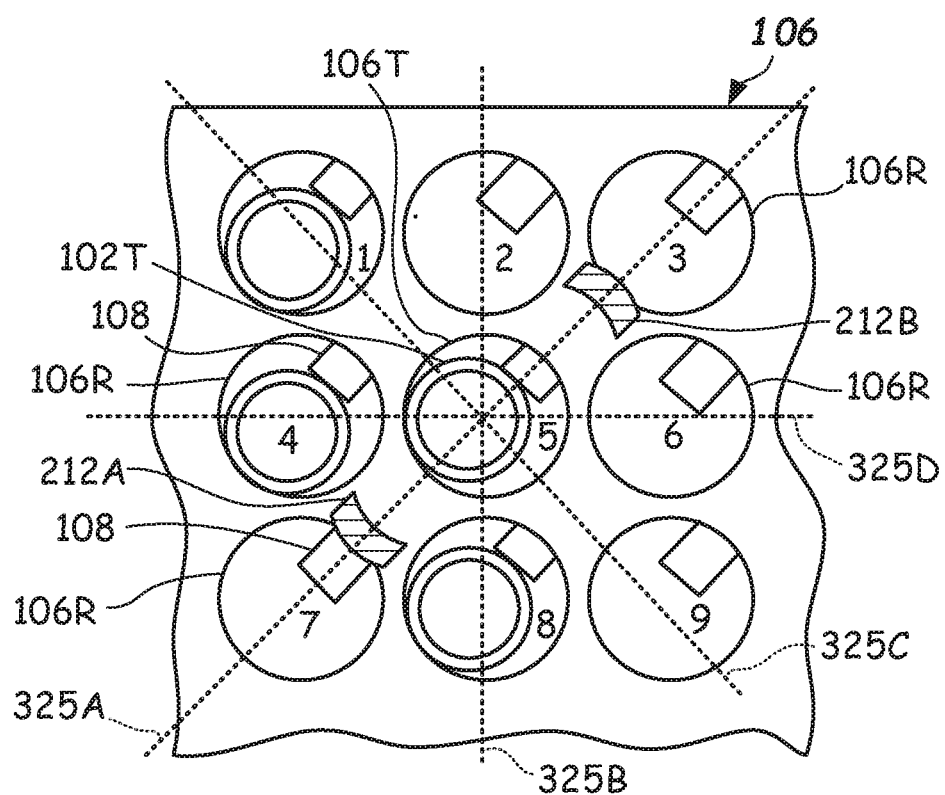
FIG. 3A illustrates a partial top plan view of a sample rack including a target specimen container, wherein gripper fingers are shown in an opened configuration with the gripper fingers fully open (separated by a maximum opening distance) according to one or more embodiments.

In one example, if two receptacles 106R on opposite sides of the target receptacle 106T are determined to be empty, as shown in FIG. 3A, then the gripper fingers 212A, 212B are opened to a maximum amount along a chosen line of action (e.g., line of action 325A) connecting the two receptacles 106R. In some embodiments one line of action is available (e.g., line of action 325A) such as when the gripper 212 is not rotatable. In other embodiments, the robot controller 216 may select another line of action if another line of action includes a higher available clearance as determined by any processing method. However, in some embodiments, as soon as one line of action is found that meets a minimum clearance value on each side of the target specimen container 102T, then the pick operation will simply commence.

Figure 3B:
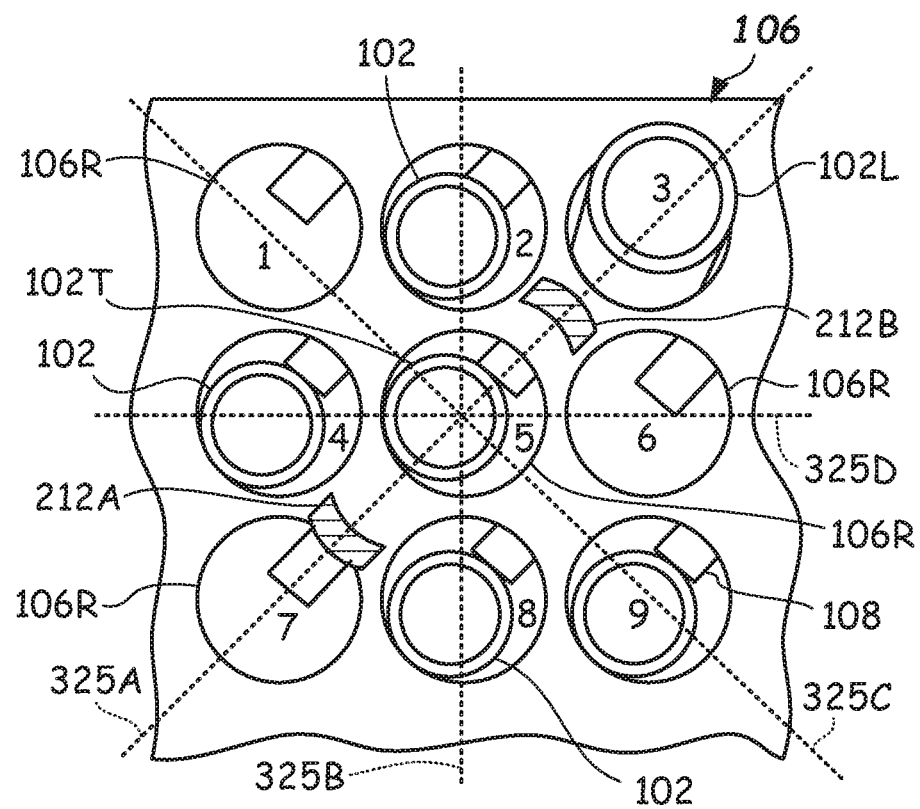
FIG. 3B illustrates a top plan view of a portion of a sample rack including a target specimen container surrounded by some empty and some full receptacles shown in a configuration where the gripper fingers are opened (separated) by an intermediate distance according to one or more embodiments.

In FIG. 3A, one method may order rank the available lines of action (e.g., 325A-325D) according to a ranking scheme. The highest ranked line of action may be chosen as the one that theoretically has the highest clearance for the gripper fingers 212A, 212B. For example, if a line of action includes two empty receptacles on opposite sides of the target receptacle, then that line of action is given a high ranking. Even among lines of action (e.g., 325A, 325D) that include two empty receptacles 106R on opposite side of the target receptacle 106T, ranking may take place whether the line of action is diagonal to a row of the sample rack 206, or along or perpendicular to a row, with the diagonal to the row receiving a relatively higher ranking, simply because there is more available spacing. Similarly, as shown in FIG. 3B, all else being equal, lines of action with one specimen container 102 on one side of the target receptacle (e.g., 325D) versus two (e.g., 325B) may be given a higher rank.

In one or more embodiments, the data may include configuration data. Configuration data is data on configuration of specimen containers 102 surrounding a target receptacle 106T, including data on the target specimen container 102T in the target receptacle 106T in the case of a pick operation. Configuration data may include a maximum diameter of each of the specimen containers 102 surrounding the target specimen container 102T, and may include a maximum diameter of the target specimen container 102T in the case of a pick operation. Configuration data may also include locations of the receptacles 106R, including the target receptacle 106T.

Specimen containers may be identified as small, medium and/or large, for example. Small may include a diameter of about 10 mm, medium may include a diameter of about 13 mm, and large may include a diameter of about 16 mm or 17 mm, for example. Other known sizes may be used and determined, such as by identifying the circular tops of the specimen containers and then counting pixels to obtain a diameter estimate. US Pat. App. No. 2016/0025757 to Pollack, et al. describes a "Tube Tray Vision System" operable to obtain information about the population and configuration by imaging. US Pat. Pub. 2105/0355208 to German et al. describes an "Automation Tube Positioning Methodology" and particularly methods of determining tube offset. Further information of visioning systems may be found in PCT Application Pub. No. WO2015/191702 filed Jun. 10, 2015, and entitled "Drawer Vision System"; PCT Application No. PCT/US2016/018100 filed Feb. 16, 2016, and entitled "Locality-Based Detection Of Tray Slot Types And Tube Types In A Vision System"; PCT Application No. PCT/US2016/018112 filed Feb. 16, 2016, and entitled "Locality-Based Detection Of Tray Slot Types And Tube Types In A Vision System"; and PCT Application No. PCT/US2016/018109 filed Feb. 16, 2016, and entitled "Image-Based Tube Slot Circle Detection For A Vision System."

Configuration data may include a height of the specimen containers 102 surrounding the target specimen container 102T (for place operations) or the height of the target specimen container 102T in the target receptacle 106T (for pick operations). Offset may be measured along a possible line of action through the target specimen container 102T or target receptacle 106T.

Configuration data obtained by imaging may include whether the specimen containers 102 are offset in a direction(s) in a particular one of the receptacles 106R. For example, configuration data may include whether the specimen containers 102 are offset due to leaning away or due to leaning towards the target receptacle 106T (for place operations) relative to their respective receptacles 106R. Configuration data may also include, for pick operations, offset of the target specimen container 102T within the target receptacle 106T, and in some embodiments, an offset distance between corresponding top portions of the target specimen container 102T and the surrounding specimen containers 102 may be determined and provided. In place operations in the target receptacle 106T, the clearance distances between respective specimen containers along each line of action may be determined.

As shown in FIG. 2B, in the case of a pick operation, the configuration data may include data on the configuration of the target specimen containers 102T and any surrounding specimen containers 102 (e.g., specimen container 102L) and in particular a clearance value C1 from the target specimen container 102T along one or more of the possible lines of action applicable to the particular type of gripper 212. For example, some types of grippers 212 may include a single line of action that may be along a 45 degree angle to the rows of the sample rack 106.

In other embodiments, the gripper fingers 212A, 212B may include multiple lines of action by rotating the gripper fingers 212A, 212B to another line of action with the rotary actuator 212R. In some embodiments, the clearance value C1, as shown in FIG. 2B, is a distance between the location of the target specimen container 102T and a surrounding one of the specimen containers 102 (e.g., large specimen container 102L). In the case where the operation is a place operation, then the clearance C2 is a distance between respective specimen containers 102 on opposite sides of the target receptacle 106T along one or more lines of action.

Referring again to FIG. 4, to carry out the pick operation, the method 400 may include moving the gripper (e.g., gripper 212) to a position above a target receptacle (e.g., target receptacle 106T). The position may be above the previously-calibrated location of the target receptacle 106T containing the target specimen container 102T. Optionally, the position in X and Y of the gripper 212 may be centered over the offset center of the top of the target specimen container 102T based upon the configuration data obtained by imagery. In 408, the gripper fingers (e.g., gripper fingers 212A, 212B) may be dynamically opened to the controlled opening distance 230 (FIG. 2B) selected based upon the data obtained by imaging. The gripper fingers 212A, 212B may be opened to the controlled opening distance 230 along a line of action and then the gripper 212 may be moved to above the target receptacle 106T, or the gripper 212 may be moved and the gripper fingers 212A, 212B may be opened to the controlled opening distance 230 along a line of action. If the gripper 212 has a single line of action (i.e., is non-rotatable) then it may be opened dynamically along that single line of action by actuation mechanism 212L.

If the gripper 212 is of the type that has rotational capability, the gripper 212 may be rotated using the rotary actuator 212R to one of the lines of action through the target specimen container 102T and dynamically opened either before or after such rotation. The selection of the sought after line of action may be by any suitable scheme, such as start and test, or by surveying and ranking the various possibilities. Start and test may include selecting a first line of action and testing it to see if minimum clearance is available for each gripper finger 212A, 212B. Surveying and rank ordering may be by surveying all the possible lines of action and the clearance available, and then rank ordering them in terms of which one has the highest clearance. The line of action with the highest clearance may be selected.

The term "dynamically" as used herein means that the opening distance 230 of the gripper fingers 212A, 212B is determined and set for each target receptacle 106T based on the data obtained by imaging, wherein the target receptacle 106T is the specific receptacle from or to which a target specimen container 102T is being picked or placed.

The data is obtained by imaging the sample rack 106 including a plurality of specimen containers 102, 102T, 102L contained in receptacles 106R therein. The imaging may take place at any convenient time, such as when initially loading the sample rack 106 into the equipment via one or more rack image capture apparatus 222 (e.g., digital camera(s)) mounted above the loading area. However, the imaging may take place in some embodiments when the sample rack 106 has come to rest in its final location. One, or more than one, rack image capture apparatus 222 (e.g., one or more digital cameras or the like) may be used to capture multiple images from different perspectives or poses.

The data may be retrieved from a database stored in memory of the image capture controller 224, or from a database stored in memory of the robot controller 216, that has received the data from the image capture controller 224. In some cases, a single processor may carry out both of the robot control functions as well as the digital imaging and image processing. The data obtained by imaging may include the population data, the configuration data, or both, as described above.

As shown in FIGS. 3A and 3B, the method 400 may, for each target receptacle 106T, survey one or more possible lines of action (e.g., line of action 325A, 325B, 325C, 325D) to determine if a minimum clearance is present along that surveyed line of action. The minimum clearance may be along the line of action (e.g., along line of action 325A, 325B, 325C, 325D) and measured between closest portions of the target specimen container 102T and any surrounding specimen containers 102, such as those positioned on either side of the target specimen container 102T along a line of action. The clearance distance on either side of the target specimen container 102T may be different. Starting with a diagonal line of action (e.g., line of action 325A), if the minimum clearance is present, then the gripper fingers 212A, 212B may carry out the pick operation by dynamically opening to the determined opening distance.

However, if more than the minimum clearance is available on both sides of the target specimen container 102T, then the gripper fingers 212A, 212B may open a relatively larger distance, thus minimizing possible contact with the target specimen container 102T. FIG. 3A illustrates a population in the sample rack 106 where receptacles 106R labeled 2, 3, 6, 7 and 9 are empty, and receptacles 106R labeled 1, 4, 5 and 8 are full and with the target specimen container 102T being in the target receptacle 106T labeled 5. Software application may survey the available lines of action and determine that the diagonal line of action 325A is optimal and allows a maximum opening distance 230 of the gripper fingers 212A, 212B. The other lines of action (e.g., 325B, 325C, 325D) may be considered suboptimal by the software because they contain one specimen container 102 in addition to the target specimen container 102T.

In cases like shown in FIG. 3B, all lines of action (e.g., 325A-325D) include one or two additional specimen containers 102 along the line of action in addition to the target specimen container 102T. In this case, diagonal lines of action (e.g., 325A, 325C) may be selected over non-diagonal lines of action (e.g., 325B, 325D) in some embodiments. Those lines of action including two specimen containers 102 (e.g., line of action 325B) may be given a low rank order. If between two acceptable lines of action, the one with a specimen container 102L with a configuration that is offset away (e.g., leaning away) from the target specimen container may be selected (e.g. line of action 325A). Once a line of action is selected from the available lines of action, the gripper fingers may be opened to a controlled opening distance 230 based upon the clearance available as determined based on the imaging data.

Figure 3C:
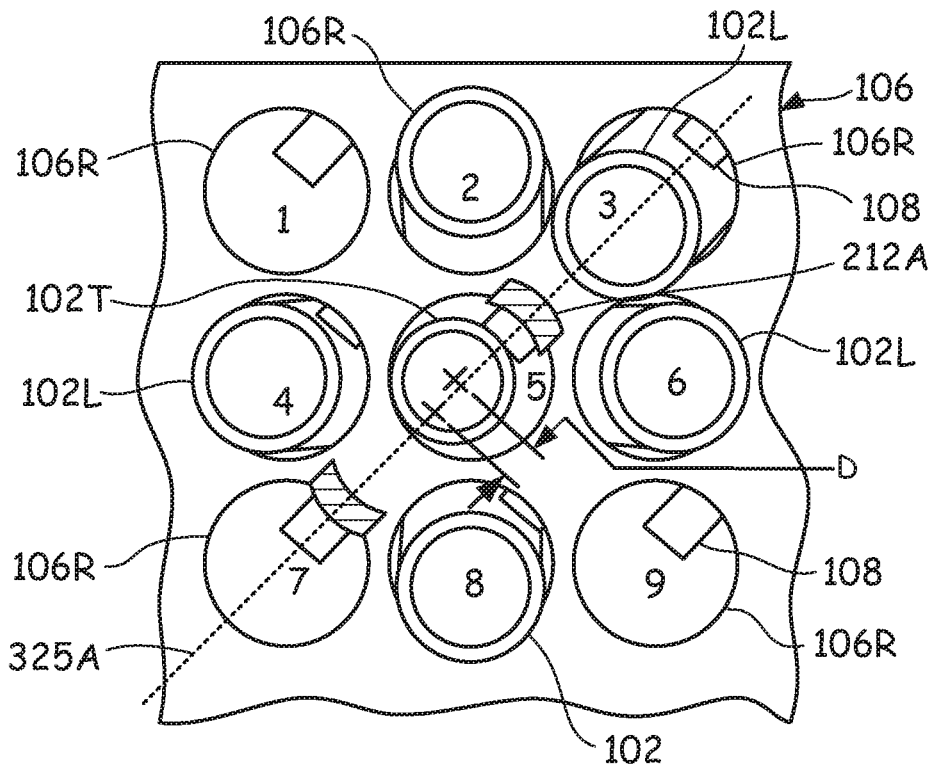
FIG. 3C illustrates a partial top plan view of a sample rack including a target specimen container offset in a receptacle, and including some surrounding specimen containers that are leaning, and with gripper fingers opened to an intermediate distance, but also with the gripper fingers offset in X-Y according to one or more embodiments.
Figure 3D:
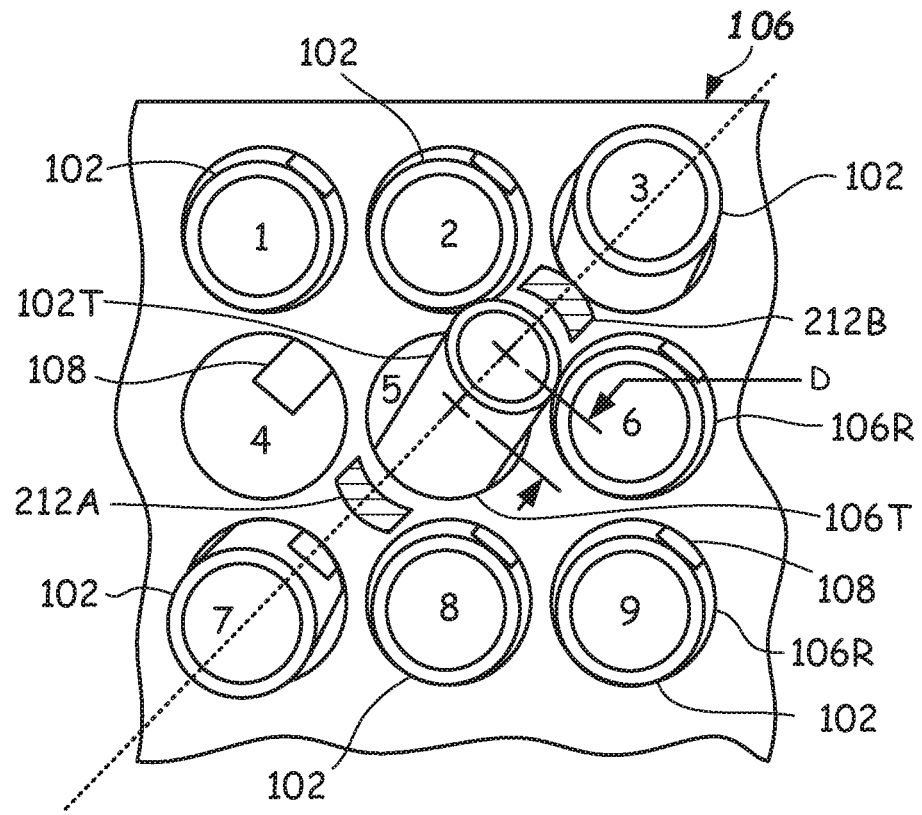
FIG. 3D illustrates a partial top plan view of a sample rack including a target specimen container offset and leaning in a receptacle, and including some receptacles with specimen containers that are leaning, and with gripper fingers in a configuration opened to an intermediate amount according to one or more embodiments.

In cases where the target specimen container 102T is offset from a determined location of the center of the target receptacle 106T based upon either calibration data or imaging, then the robot 210 may be positioned at an X and/or Y position so that the gripper 212 is centered over a top of the target specimen container 102T. However, in some instances, as shown in FIGS. 3C and 3D, the gripper 212 may be further offset in the X and/or Y directions by an offset distance D as measured along the line of action 325A. As shown in FIGS. 3C and 3D, the gripper axis 220 is positioned offset from a center location of the top of the target specimen container 102T. This may provide additional clearance between a leaning specimen container 102L, such as is shown in receptacle 106R and labeled 3, wherein the specimen container 102L leans toward the target specimen container 102T.

As shown in FIG. 3D, the offset distance D may be provided when the target specimen container 102T is leaning, so as to first contact the target specimen container 102T with an individual one of the gripper fingers 212A, 212B, which may bring the target specimen container 102T into an upright configuration. For example, the offset distance D may be away from a center of the top the target specimen container 102T along the selected line of action, but towards a center of the target receptacle 106T. Combinations of variable finger opening distance 230, finger rotational orientation, and offset distance D in x and/or y may be used for any particular pick of a target specimen container 102T or place of a target specimen container 102T into a target receptacle 106T.

In some embodiments, the configuration data includes tube height and/or tube type. For example, tube height data obtained by imaging may be used to determine how deeply the gripper 212, and thus gripper fingers 212A, 212B, should be moved in the minus Z direction in order to perform a pick operation. Tube height data may also be used to allow maneuvering of the gripper 212 when grasping a target specimen container 102T just picked from a target receptacle 106T to the next destination (e.g., to a specimen container carrier) without collision, but without having to raise the target specimen container 102T above the highest specimen container 102L. In some instances, potential contact by the gripper fingers 212A, 212B may be entirely avoided by grasping a large specimen container 102L identified based on the data obtained by imaging at a location that is vertically above a top of a neighboring smaller specimen container(s) 102.

In other cases, tube type may be discriminated based upon imaging data and/or gripper data. For example, a tube top specimen container may be provided in the specimen container 102 in some embodiments. The imaging data may indicate a large diameter specimen container 102, but the gripper feedback data from the linear encoder 212LE (FIG. 2A) may indicate a small diameter specimen container 102. However, these two pieces of data together may be indicative of a tube top specimen container being present in the target specimen container 102T.

The data obtained by imaging may also be used to help select a receptacle 106R for placement of the specimen container 102R after the specimen container returns from processing. Because the population data was originally known, the history of removal and reinsertion may be tracked to arrive at modified data on the population of the sample rack 106. As such, a position for reinsertion of the target specimen container 102T may be selected based upon the modified data.

While specific apparatus, systems, and methods have been shown by way of example embodiments described in detail herein, it should be understood that other and different embodiments are possible. It is intended that the disclosure is to cover all modifications, equivalents, and alternatives falling within the scope of the appended claims.

What is claimed is:

1. A method of operating a gripper to pick or place a specimen container, comprising:
   providing a robot including the gripper, the gripper moveable in a coordinate system by the robot and including gripper fingers;
   providing a sample rack including receptacles accessible by the gripper fingers, at least some of the receptacles containing specimen containers;
   providing data, obtained by imaging the specimen containers in the sample rack; and
   dynamically orienting the gripper fingers based upon the data.

2. The method of claim 1, wherein the dynamically orienting the gripper comprises opening the gripper fingers a distance that is variable and that is selected based on the data.

3. The method of claim 1, wherein each of the gripper fingers are coupled to an actuation mechanism, and wherein the dynamically orienting the gripper comprises selecting a gripper line of action by rotating the gripper fingers by way of the actuation mechanism to a defined rotational position based upon the data.

4. The method of claim 1, wherein the dynamically orienting the gripper comprises adjusting an X and Y position of the gripper based upon the data.

5. The method of claim 1, wherein the data includes a population data on which receptacles in the sample rack contain a specimen container.

6. The method of claim 1, wherein the data includes a population data on which receptacles, surrounding a target receptacle, contain specimen containers.

7. The method of claim 1, wherein the data includes a configuration data on specimen containers surrounding a target receptacle.

8. The method of claim 7 wherein the configuration data comprises one or more of: tube diameter, tube offset, tube height, and tube type.

9. The method of claim 7 wherein the configuration data comprises an offset to a top of a target specimen container relative to a center of a target receptacle.

10. The method of claim 7 wherein the data comprises population data that is generated from a sample rack image capture system.

11. The method of claim 10, wherein the population data comprises data on which of the receptacles, surrounding the target receptacle, are empty.

12. A method of operating a gripper to pick or place a specimen container, comprising:
    providing a robot including the gripper, the gripper moveable in a coordinate system by the robot and including gripper fingers;
    providing a sample rack including receptacles accessible by the gripper fingers, at least some of the receptacles containing specimen containers;
    providing data, obtained by imaging, regarding the specimen containers in the sample rack wherein the data comprises population data that is generated from a sample rack image capture system and data further includes a configuration data on specimen containers surrounding a target receptacle and the population data further comprises data on which of the receptacles, surrounding the target receptacle, are empty; and
    dynamically orienting the gripper fingers based upon the data and wherein if two receptacles on opposite sides of the target receptacle are determined to be empty, then the gripper is opened to a maximum amount along a line of action connecting the two receptacles.

13. The method of claim 1, wherein an X and Y position of the gripper is adjusted to provide a condition of least interference with neighboring specimen containers.

14. The method of claim 1, wherein an X and Y position of the gripper and extent of opening of the gripper is adjusted based upon the data.

15. The method of claim 1, wherein selection of a receptacle for reinsertion of a specimen container after processing is decided based upon modified data.

16. A gripper positioning apparatus, comprising:
a robot including a gripper, the gripper moveable in a coordinate system by the robot and including gripper fingers;
a sample rack including receptacles accessible by the gripper fingers, at least some of the receptacles containing specimen containers; and
a controller including data, obtained by imaging the specimen containers in the sample rack, and operatively configured to cause the gripper fingers to be dynamically oriented based upon the data.

17. The gripper positioning apparatus of claim 16, wherein the data comprises population data on the receptacles of the sample rack and configuration data on the specimen containers.

18. The gripper positioning apparatus of claim 16, comprising an actuator coupled to the gripper fingers to cause opening of the gripper fingers to a dynamically-determined opening distance based on the data obtained my imaging.

19. The gripper positioning apparatus of claim 16, comprising a rotary actuator coupled to the gripper fingers to cause rotation the gripper fingers by way of the rotary actuator to a dynamically-determined rotational orientation based on the data obtained my imaging.

20. A gripper positioning apparatus, comprising:
a robot including a gripper, the gripper moveable in a coordinate system by the robot and including gripper fingers that open a distance that is variable;
a sample rack including receptacles accessible by the gripper fingers, at least some of the receptacles containing specimen containers; and
a robot controller configured to receive data, obtained by imaging the specimen containers in the sample rack, and operatively configured to cause the gripper fingers to be dynamically oriented to:
open to an opening distance as determined based on the data,
rotate to a rotational orientation as determined based on the data, or
move to an x-y position to provide a condition of least interference between the gripper fingers and neighboring specimen containers contained in the sample rack as determined based on the data.

* * * * *